US011645693B1

(12) United States Patent
Lin et al.

(10) Patent No.: US 11,645,693 B1
(45) Date of Patent: May 9, 2023

(54) COMPLEMENTARY CONSUMER ITEM SELECTION

(71) Applicant: AMAZON TECHNOLOGIES, INC., Seattle, WA (US)

(72) Inventors: Yen-Liang Lin, Redwood City, CA (US); Son Tran, Mountain View, CA (US); Larry Davis, Brooklyn, NY (US)

(73) Assignee: Amazon Technologies, Inc., Seattle, WA (US)

( * ) Notice: Subject to any disclaimer, the term of this patent is extended or adjusted under 35 U.S.C. 154(b) by 434 days.

(21) Appl. No.: 16/804,758

(22) Filed: Feb. 28, 2020

(51) Int. Cl.
*G06F 17/16* (2006.01)
*G06N 3/04* (2006.01)
*G06N 3/08* (2006.01)
*G06Q 30/0601* (2023.01)

(52) U.S. Cl.
CPC ......... *G06Q 30/0629* (2013.01); *G06F 17/16* (2013.01); *G06N 3/04* (2013.01); *G06N 3/08* (2013.01); *G06Q 30/0641* (2013.01)

(58) Field of Classification Search
CPC .............. G06F 17/16; G06Q 30/0641; G06Q 30/0629; G06N 3/04; G06N 3/08; G06N 3/049; G06N 3/02; G06N 20/00; G06N 3/088; G06N 5/022
See application file for complete search history.

(56) References Cited

U.S. PATENT DOCUMENTS

| | | | |
|---|---|---|---|
| 8,364,520 B1 * | 1/2013 | Eichorn | G06Q 30/0246 705/7.31 |
| 10,796,363 B1 * | 10/2020 | Kim | G06Q 20/40 |
| 11,423,476 B1 * | 8/2022 | Kim | G06Q 20/202 |
| 2004/0078299 A1 * | 4/2004 | Down-Logan | G06Q 30/02 705/26.1 |
| 2014/0180826 A1 * | 6/2014 | Boal | G06Q 30/0207 705/14.66 |
| 2021/0110457 A1 * | 4/2021 | Polanía Cabrera | G06N 3/08 |
| 2021/0192568 A1 * | 6/2021 | Taghavi Nasr Abadi | G06N 20/20 |

FOREIGN PATENT DOCUMENTS

| | | | | |
|---|---|---|---|---|
| CN | 110447039 A | * | 11/2019 | G06K 9/6268 |
| WO | WO-2013115114 A1 | * | 8/2013 | H01M 10/054 |

* cited by examiner

*Primary Examiner* — Todd Buttram
(74) *Attorney, Agent, or Firm* — Lowenstein Sandler LLP (57) ABSTRACT

An example method of complementary consumer item selection includes: receiving, by a computer system, an image representing a first consumer item of a reference set of consumer items; identifying a target category of a complementary consumer item to be associated with the reference set of consumer items; generating, by a neural network processing the set of images, a feature embeddings representing the first consumer item in relation to the target category; selecting, using the feature embedding, from a set of available consumer items, a plurality of candidate consumer items associated with the target category; and selecting, among the plurality of candidate consumer items, the complementary consumer item to be associated with the reference set of consumer items.

13 Claims, 8 Drawing Sheets

COMPLEMENTARY CONSUMER ITEM SELECTION

BACKGROUND

Both online and off-line retailers offer their customer wide varieties of consumer items, such as fashion items (including clothing items, shoes, and accessories), furniture items, etc. In the online world, various functions that in the brick-and-mortar retail stores have been performed by humans may be automated and/or delegated back to the customer. Furthermore, online solutions may offer various novel functionality, which did not even exist before the advent of the Internet.

BRIEF DESCRIPTION OF THE DRAWINGS

The examples described herein will be understood more fully from the detailed description given below and from the accompanying drawings, which, however, should not be taken to limit the application to the specific examples, but are for explanation and understanding.

DETAILED DESCRIPTION

Described herein are systems and methods for complementary consumer item selection. In various implementations, consumer items may be provided by fashion items, furniture items, home décor items, and/or other consumer goods, the compatibility of which may be ascertained based on their respective visual appearances and functions.

In an illustrative example, online and off-line retail customers may shop for fashion items that would be visually and functionally compatible with one or more fashion items that have been previously selected or purchased. In another illustrative example, online and off-line retail customers may shop for furniture items and/or design accessories that would be visually and functionally compatible with one or more furniture items that have been previously selected or purchased. Thus, recommending one or more compatible consumer items would both improve the customer experience and increase the sales.

Accordingly, the task of complementary consumer item selection may involve identifying, among a plurality of available consumer items, one or more consumer items that are compatible with a given set of consumer items, such as a fashion ensemble or a furniture set. For example, selecting a purse that is compatible with a given fashion ensemble including a top (e.g., a blouse), a bottom (e.g., a skirt), and a pair of shoes.

A sought for complementary item usually belongs to an item category that is different from the item categories in the reference set of consumer items. Thus, such a complementary item may be, at least in some aspects, visually dissimilar from the other items in the set of consumer items, while being consistent with the overall set of consumer items style, which may be reflected by multiple attributes such as color, pattern, material, etc. Furthermore, a practical item selection system should be able to support large scale searching, thus rendering impracticable various brute force approaches that are based on exhaustive pairwise comparison.

Implementations of the present disclosure address the above-noted and other deficiencies by employing a neural network, referred to as "category-based subspace-attention network" herein, which generates feature embeddings representing various consumer items.

"Neural network" herein shall refer to a computational model, which may be implemented by software, hardware, or combination thereof. A neural network includes multiple inter-connected nodes called "artificial neurons," which loosely simulate the neurons in an animal brain. An artificial neuron processes a signal received from another artificial neuron and transmit the transformed signal to other artificial neurons. The output of each artificial neuron may be represented by a function of a linear combination of its inputs. Edge weights, which increase or attenuate the signals being transmitted through respective edges connecting the neurons, as well as other network parameters, may be determined at the network training stage based on a training dataset that includes a plurality of labeled inputs (i.e., inputs with known classification). In an illustrative example, the edge weights and/or other network parameters are initialized to random or predetermined values. For every input in the training dataset, the neural network is activated. The observed output of the neural network is compared with the desired output specified by the training dataset, and the error is propagated back to the previous layers of the neural network, in which the weights are adjusted accordingly. This process may be repeated until the output error falls below a predetermined threshold.

"Embedding" herein shall refer to a vector of real numbers representing a consumer item in a multidimensional space having an associated distance metric reflecting consumer item compatibility, such that two or more vectors representing compatible consumer items would be located close to each other, based on a chosen distance metric, in the multidimensional space. The embeddings computed by the category-based subspace-attention network may then be utilized for indexing the consumer item database in order to select compatible consumer items, as described in more detail herein below.

The category-based subspace-attention network implemented in accordance with aspects of the present disclosure receives, as its inputs, the source image representing a consumer item, the category vector of the consumer item depicted by the source image, and the target category vector (i.e., the category in which compatible consumer items are sought). The source image is passed through a convolutional neural network (CNN) for feature extraction. The two category values are utilized to form attention weights that bias the final embedding produced by the category-based subspace-attention network towards the area of the multidimensional space that is supposedly relevant for the source and target categories.

The category-based subspace-attention network may be trained on a training dataset that includes a set of training data items, such that each training data item includes images of a reference set of consumer items, an image of a positive consumer item that is compatible with the reference set of consumer items, and images of negative consumer items that are incompatible with the reference set of consumer items. The training process involves selecting the network parameters that would minimize the ensemble ranking loss, which takes into account all items of the set of consumer items, thus improving the prediction accuracy, as described in more detail herein below.

Complementary item selection for a given set of consumer items ("reference set of consumer items") and a specified target category may involve feeding each consumer item in the reference set of consumer items, together with its category and the target category, to the category-based subspace attention network, which produces the feature embedding corresponding to the reference item and the target category. The embedding is utilized to identify one or more compatible candidate items in the database of items, which has been previously been indexed based on the embeddings corresponding to each stored item and a set of target categories. For each identified candidate item, its distance to the reference set of consumer items is computed, and the item having the lowest distance metric is selected as the compatible item, as described in more detail herein below.

Therefore, the systems and methods described herein improve the efficiency and accuracy of complementary consumer item selection, by implementing a category-based subspace-attention network that produces feature embeddings, which may be utilized for scalable indexing and item identification, as described in more detail herein below.

The systems and methods described herein may be implemented by hardware (e.g., general purpose or specialized processing devices, or other devices and associated circuitry), software (e.g., instructions executable by a processing device), or a combination thereof. Various aspects of the above referenced methods and systems are described in details herein below by way of example, rather than by way of limitation. In particular, while the examples described with references to FIGS. 1-4 are related to fashion items, the systems and methods described herein may be similarly applied to other kinds of consumer items, such as furniture items, home décor items, and/or other consumer goods, the compatibility of which may be ascertained based on their respective visual appearances and functions.

Figure 1:
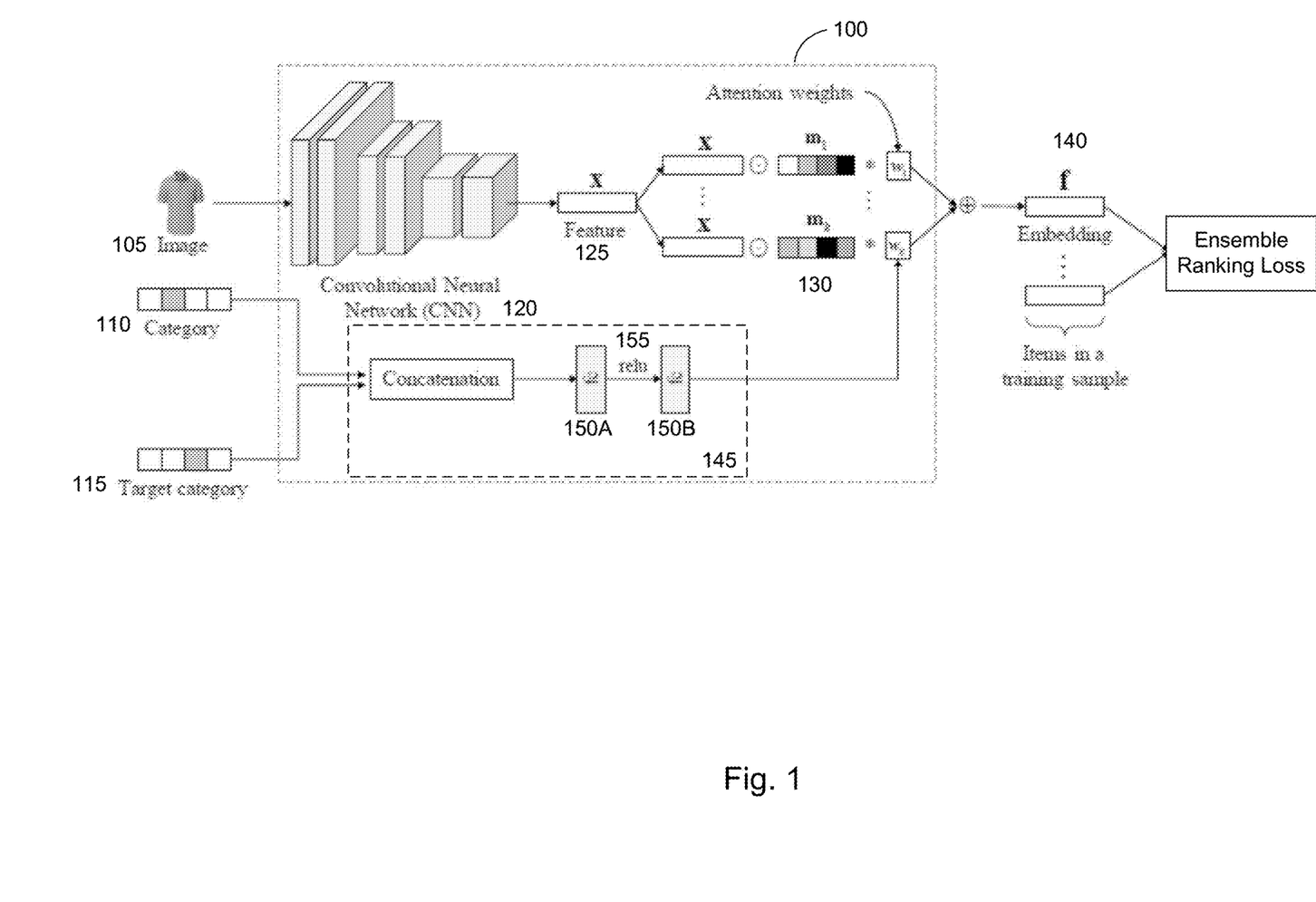
FIG. 1 schematically illustrates an example category-based subspace-attention network for generating feature embeddings representing consumer items, in accordance with embodiments of the present disclosure.

FIG. 1 schematically illustrates an example category-based subspace-attention network 100 for generating feature embeddings representing consumer items, in accordance with embodiments of the present disclosure. "Embedding" herein shall refer to a vector of integer or real numbers representing a consumer item in a multidimensional space, such that compatible consumer items would be located close to each other, based on a chosen distance metric, within the multidimensional space. The embdeddings computed by the category-based subspace-attention network 100 may be utilized for indexing the consumer item database in order to select compatible consumer items, as described in more detail herein below with references to FIG. 3. Individual components of the feature embeddings, which correspond to respective dimensions of the multidimensional space, may have no discernable semantic meaning and/or no perceivable relationship to the visual appearance and functional designation of the consumer items.

Referring now to FIG. 1, the category-based subspace-attention network 100 implements a non-linear function $\Psi(I_s, c_s, c_t)$ that receives, as its inputs, the source image $I_s$ (105) representing a consumer item, the category vector $c_s$ (110) of the consumer item depicted by the source image, and the target category vector (i.e., the category in which compatible consumer items are sought) $c_t$ (115). The category-based subspace-attention network 100 generates a feature embedding f representing the input image $I_s$ in relation to the target category $c_t$.

In an illustrative example, a consumer item category may reflect the functional designation of the consumer item, e.g., in the case of complementary fashion item selection, the functional categories may include outerwear, bags, shoes, accessories, sunglasses, etc. In various implementations, the granularity of category definition may vary (e.g., by distinguishing between jackets and coats in one implementation, while combining those two into a common category of outerwear in another implementation). The consumer item categories may be provided, e.g., by integer vectors of a certain size.

The source image 105 is fed to the convolutional neural network (CNN) 120, which produces a visual feature vector x (125). A set of masks m (130) is then applied to the visual feature vector x via Hadamard product in order to obtain the subspace embeddings by projecting the visual feature vector into a set of subspaces that encode different aspects of consumer item similarity (although, as noted herein above, the subspaces may have no discernable semantic meaning and/or no perceivable relationship to the visual appearance and functional designation of the consumer items).

The final embedding f (140) is computed as a weighted sum of the subspace embeddings:

$$f = \sum_{i=1}^{k}(x \odot m) * w_i \quad (1)$$

where f denotes the feature embedding, x denotes the visual feature vector extracted by the CNN 120, m denotes the set of masks $(m_1, \ldots, m_k)$ that are applied to the visual feature vector, $\odot$ denotes the Hadamard product, which takes two vectors of equal dimensions and produces a resulting vector of the same dimension as the operand vectors, such that i-th element of the resulting vector is the product of i-th elements of the operand vectors, and $w_i$ denotes the i-th weight coefficient (also referred to as "subspace attention weight").

The subspace attention weights $w_i$, which define the degree of influence of each component of the visual feature vector x on the resulting feature embedding f, are computed by the sub-network 145. The sub-network 145 concatenates the two input category vectors $s_c$ and $s_c$ and processes the result of the concatenation operation by two sequential fully-connected layers 150A-150B with a softmax function 155, which transforms the output of the fully-connected layer 150A into the input of the fully-connected layer 150B. The masks $m_i$, the weight coefficients $w_i$, and various parameters of the CNN 110 and the sub-network 145 may be determined by the training process.

Figure 2:
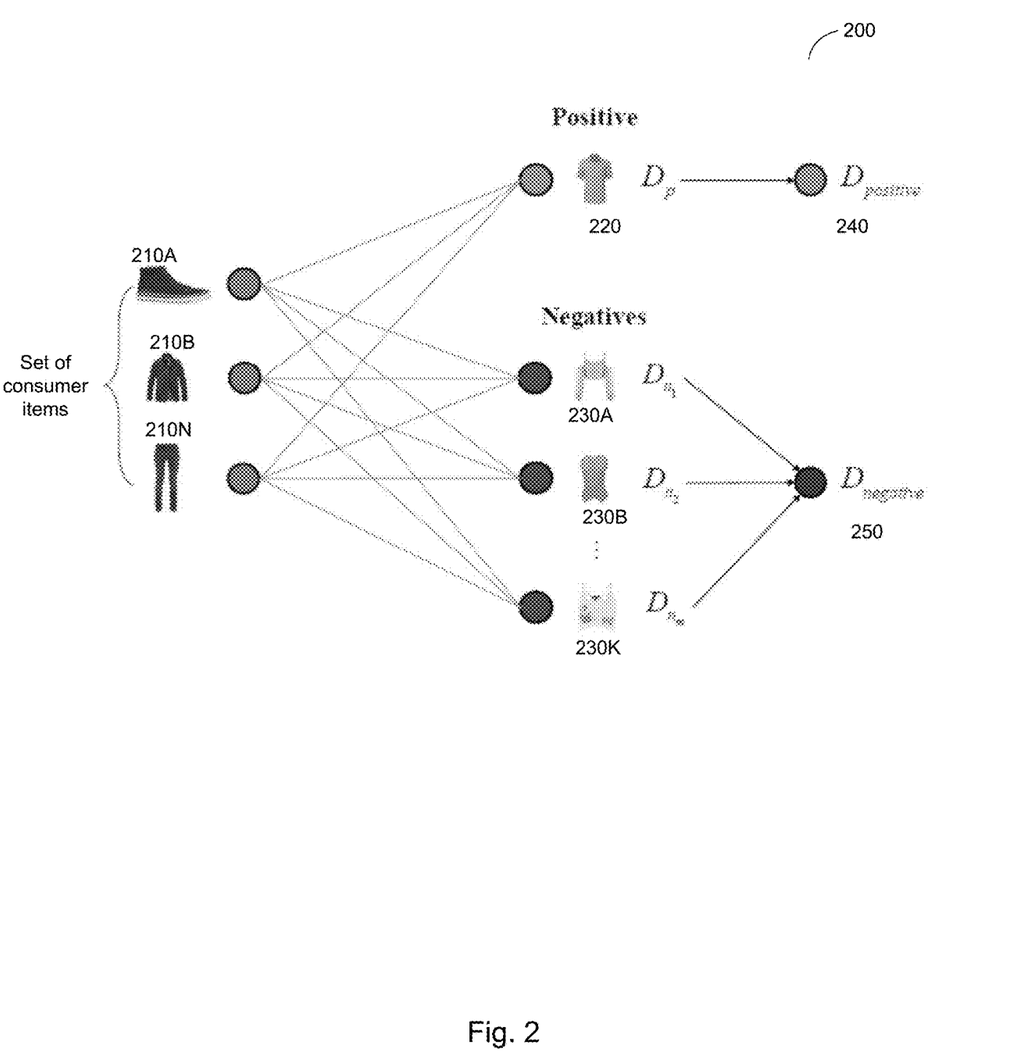
FIG. 2 schematically illustrates a training dataset utilized for training the category-based subspace-attention network, in accordance with embodiments of the present disclosure.

FIG. 2 schematically illustrates a training dataset utilized for training the category-based subspace-attention network, in accordance with embodiments of the present disclosure. As schematically illustrated by FIG. 2, the category-based subspace-attention network 100 may be trained on a training dataset that includes a set of training data items, such that each training data item 200 is a triplet Y={O,p,N} that includes a reference set of consumer items represented by a set of images 210A-210N of consumer items O={$I_1^o$, ... $I_n^o$}, a positive consumer item p={$I^p$} that is compatible with the set of consumer items O and is represented by its image 220, and a set N={$I_1^n$, ... $I_n^n$} of negative consumer items that are incompatible with the set of consumer items O and a represented by their respective images 230A-230K. The training process involves selecting the network parameters that would minimize the ensemble ranking loss based on the positive distance 240 and the negative distance 250, as described in more detail herein below.

The category-based subspace-attention network 100 is employed to compute the feature embeddings for each image of the reference set of consumer items O:

$$f_i^o = \Psi(I_i^o, c(I_i^o), c(I^p)) \text{ for each } i=1, \ldots, n \quad (2)$$

where $\Psi$ denotes the non-linear function implemented by the category-based subspace-attention network 100, $I_i^o$ denotes the i-th image of the set of consumer items O, $c(I_i^o)$ denotes the category of the i-th image of the set of consumer items O, and $c(I^p)$ denotes the category of the positive consumer item $I^p$.

Similarly, the category-based subspace-attention network 100 is employed to compute the feature embeddings for the positive consumer item $I^p$:

$$f_i^p = \Psi(I^p, c(I_i^o)c(I^p)) \text{ for each } i=1, \ldots, n \quad (3)$$

Since, as noted herein above, the feature embedding produced by the category-based subspace-attention network 100 depends on the source image category and the target image category, multiple embeddings are generated for the positive consumer item $I^p$, such that each embedding would correspond to the respective set of consumer item category $c(I_i^o)$.

Similarly, the category-based subspace-attention network 100 is employed to compute the feature embeddings for each negative consumer item $I_j^n$:

$$f_i^{nj} = \Psi(I_j^n, c(I_i^o), c(I_j^n)) \text{ for each } i=1, \ldots, n \text{ and } j=1, \ldots, m \quad (4)$$

Thus, multiple embeddings are generated for each negative consumer item $I_j^n$, such that each embedding would correspond to the respective set of consumer item category $c(I_i^o)$.

Furthermore, the distance between a consumer item s (which may be represented by a positive or negative consumer item) and the entire set of consumer items O may be computed as follows:

$$D_{ensemble}(O, s) = \frac{1}{n}\sum_{i=1}^{n} d(f_i^o, f_i^s) \quad (5)$$

where i is the index of an image in the set of consumer items O.

$f_i^o$ and $f_i^s$ denote the feature embeddings for images i and s, respectively, and $d(f_i^o, f_i^s)$ denotes the distance between images represented by respective embeddings $f_i^o$ and $f_i^s$.

Equation (5) may be used for computing, for the given set of consumer items, the distances for the positive consumer item $D_p = D_{ensemble}(O,p)$ and the negative consumer items $D_j = D_{ensemble}(O,n_j)$ for j=1, ... m. The negative item distances are then aggregated by an aggregation function $\varphi$ (e.g., minimum or average): $D_n = \varphi(D_{n1}, \ldots, D_{nm})$.

The ensemble ranking loss may then be computed as follows:

$$l(O,p,N) = \max(0, D_p - D_N + M) \quad (6)$$

where l denotes the ensemble ranking loss, and

M denotes a predetermined distance margin (i.e., a positive value).

Thus, training the category-based subspace-attention network 100 may involve determining the values of network parameters that would minimize the overall ensemble ranking loss, which may be computed by aggregating the individual ranking losses computed for every data item in the training dataset (e.g., using the average of the maximum value of the individual ranking losses). Such parameters may include the masks $m_i$, the weight coefficients and various parameters of the CNN 110 and/or the sub-network 145.

The trained category-based subspace-attention network 100 may be tested on one or more validation datasets, and one or more validation metrics (such as precision, recall, F-measure, etc.) may be evaluated. Should the computed validation metric values fall outside of their respective predetermined ranges, the category-based subspace-attention network 100 may be further trained based on new and/or modified training datasets.

Upon successfully validation, the trained category-based subspace-attention network 100 may be utilized for complementary item selection from a database of images of consumer items. In order to efficiently perform the item selection task, the database may be indexed by the embedding values which may be computed for each stored image by the category-based subspace-attention network 100.

Figure 3:
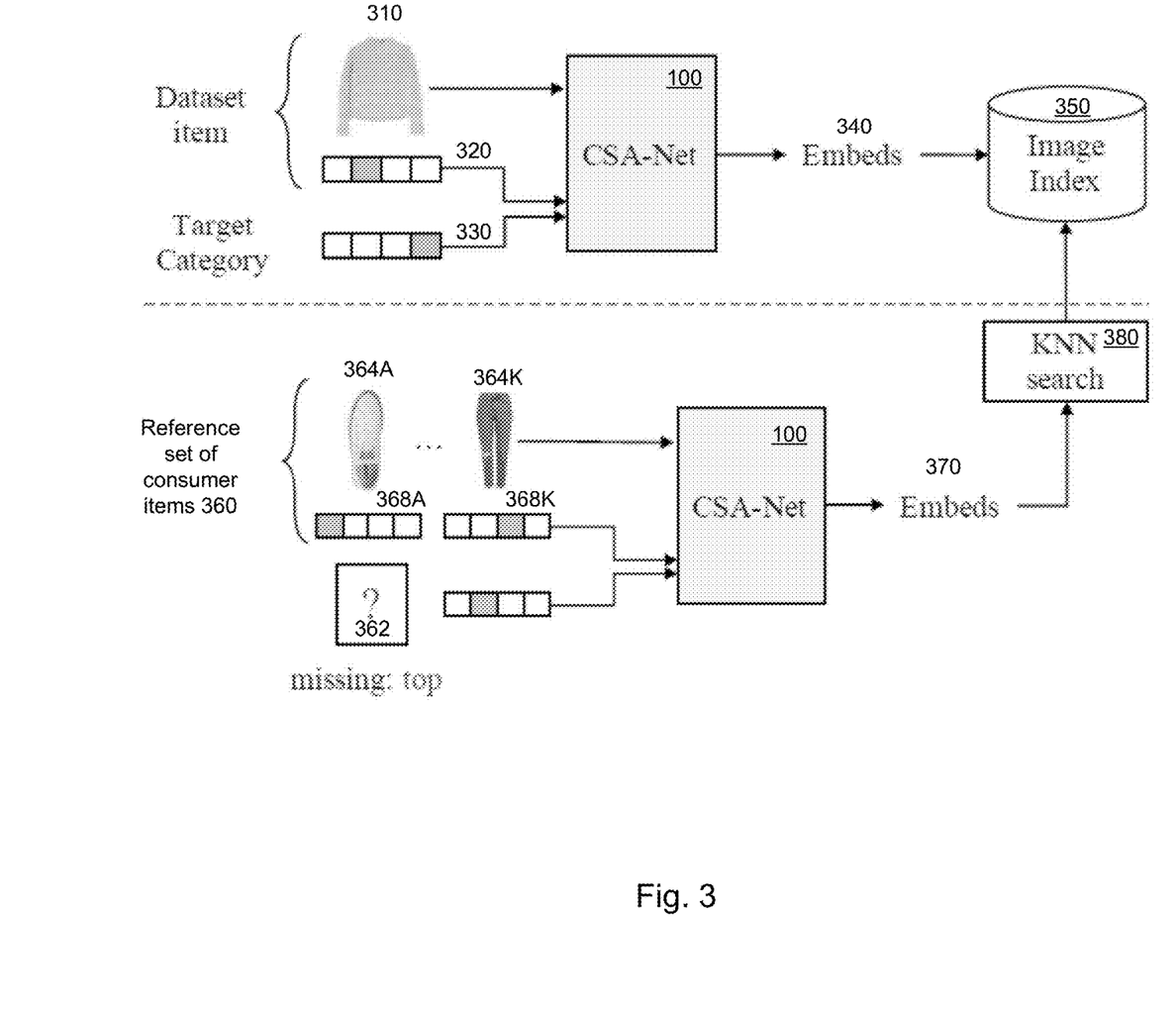
FIG. 3 schematically illustrates utilizing the category-based subspace-attention network for database indexing and complementary item selection, in accordance with embodiments of the present disclosure.

FIG. 3 schematically illustrates utilizing the category-based subspace-attention network 100 for database indexing and complementary consumer item selection, in accordance with embodiments of the present disclosure. As noted herein above, different combinations of the image categories may result in different subspace attention weights of the category-based subspace-attention network 100, which would thus produce different embeddings for a given consumer item in relation to each target category. Accordingly, as schematically illustrated by FIG. 3, multiple embeddings of each consumer item stored in the database may be computed for a set of target categories, such that each embedding represents a given consumer item 310 of a known category 320 in relation to a target category 330 of the set of target categories. The computed embedding 340 may be stored in the image database 350 in association with the consumer item image 310 and the target category 330 for which the embedding has been computed. For example, for a shoe item, its embeddings may be computed for various target categories, such as tops, bottoms, bags, accessories, etc., thus allowing complementary item selection for each of the category pairs (i.e., selecting shoes compatible with a given clothing top, a given clothing bottom, a given bag, a given accessory, etc.).

Figure 4:
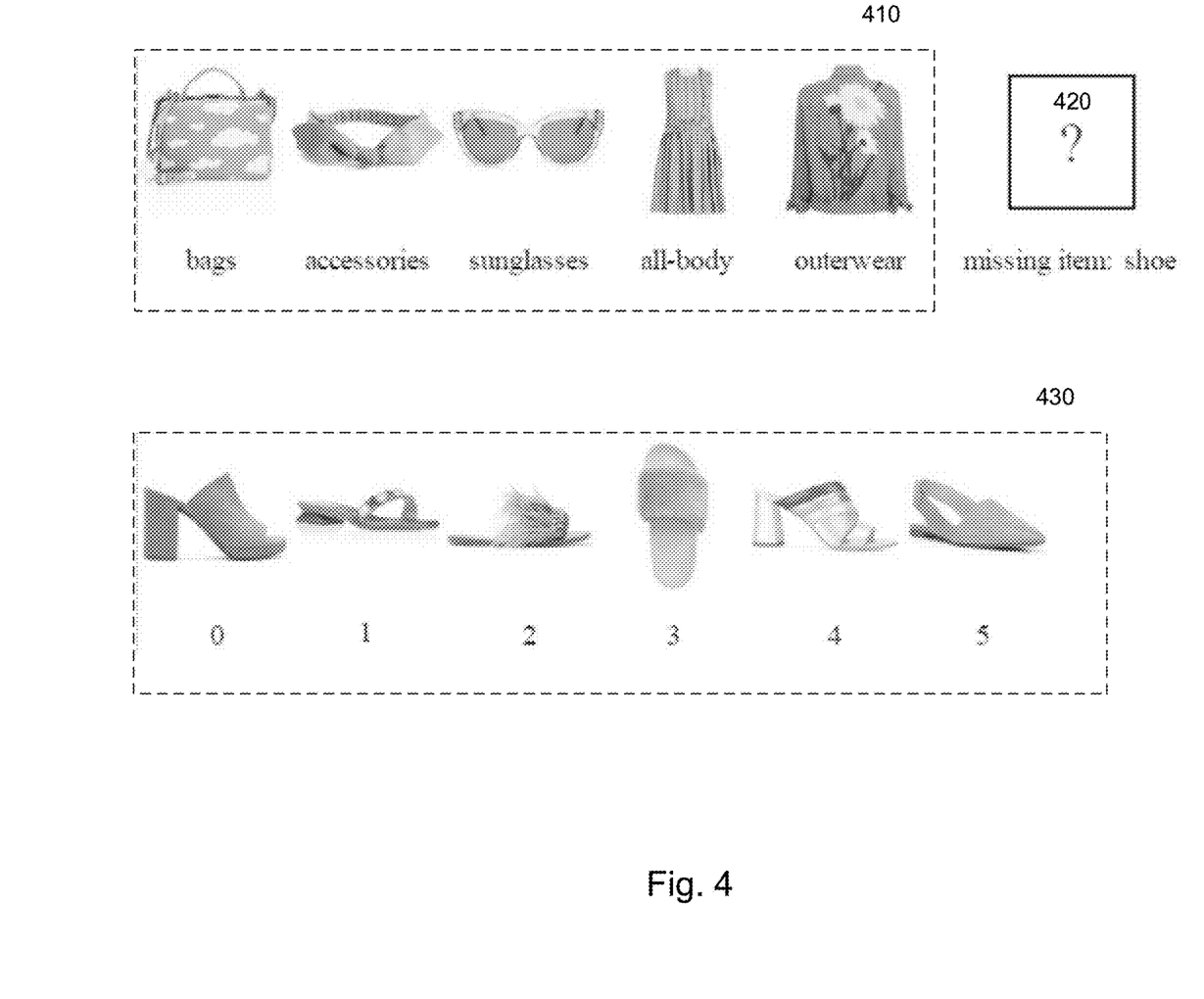
FIG. 4 schematically illustrates complementary item selection for a given fashion ensemble and a specified target category, in accordance with embodiments of the present disclosure.

FIG. 4 schematically illustrates complementary item selection for a given set of consumer items 410 and a specified target category 420, in accordance with embodiments of the present disclosure. As schematically illustrated by FIG. 4, a missing item of the specified target category 420 may be selected among candidate items 430 of the specified target category 420. Referring again to FIG. 3, complementary item selection for a given set of consumer items ("the reference set of consumer items") 360 and a specified target category 362 may involve feeding each consumer item 364A-364362K of the reference set of consumer items 360, together with its category and the target category, to the category-based subspace attention network, which produces the feature embedding 370 corresponding to the reference item 360 and the target category 362. The embedding is utilized to identify one or more compatible candidate items in the database 350 of items, which has been previously been indexed based on the embeddings corresponding to each stored item and a set of target categories. For each identified candidate item, its distance to the reference set of consumer items is computed, and the item having the lowest distance metric is selected as the complementary item.

In particular, each consumer item 364 of the reference set of consumer items 360, together with its category 368 and the target category 362 is fed to the category-based subspace attention network 100, which produces the feature embedding 370 corresponding to the reference item 364 and the target category 362. The embedding is utilized to identify (e.g., by k-nearest neighbor (KNN) search 380) one or more compatible candidate items in the indexed database 350 of items. For each identified candidate item, its distance to the reference set of consumer items 360 may be computed, and the item having the lowest distance metric may be selected as the complementary item.

Notably, the reference set of consumer items may consist of a single consumer item or may include multiple consumer items. Furthermore, once the complementary item for the reference set is identified, it may be added to the reference set, another target category may be selected, and the complementary item selection procedure may be repeated.

Figure 5:
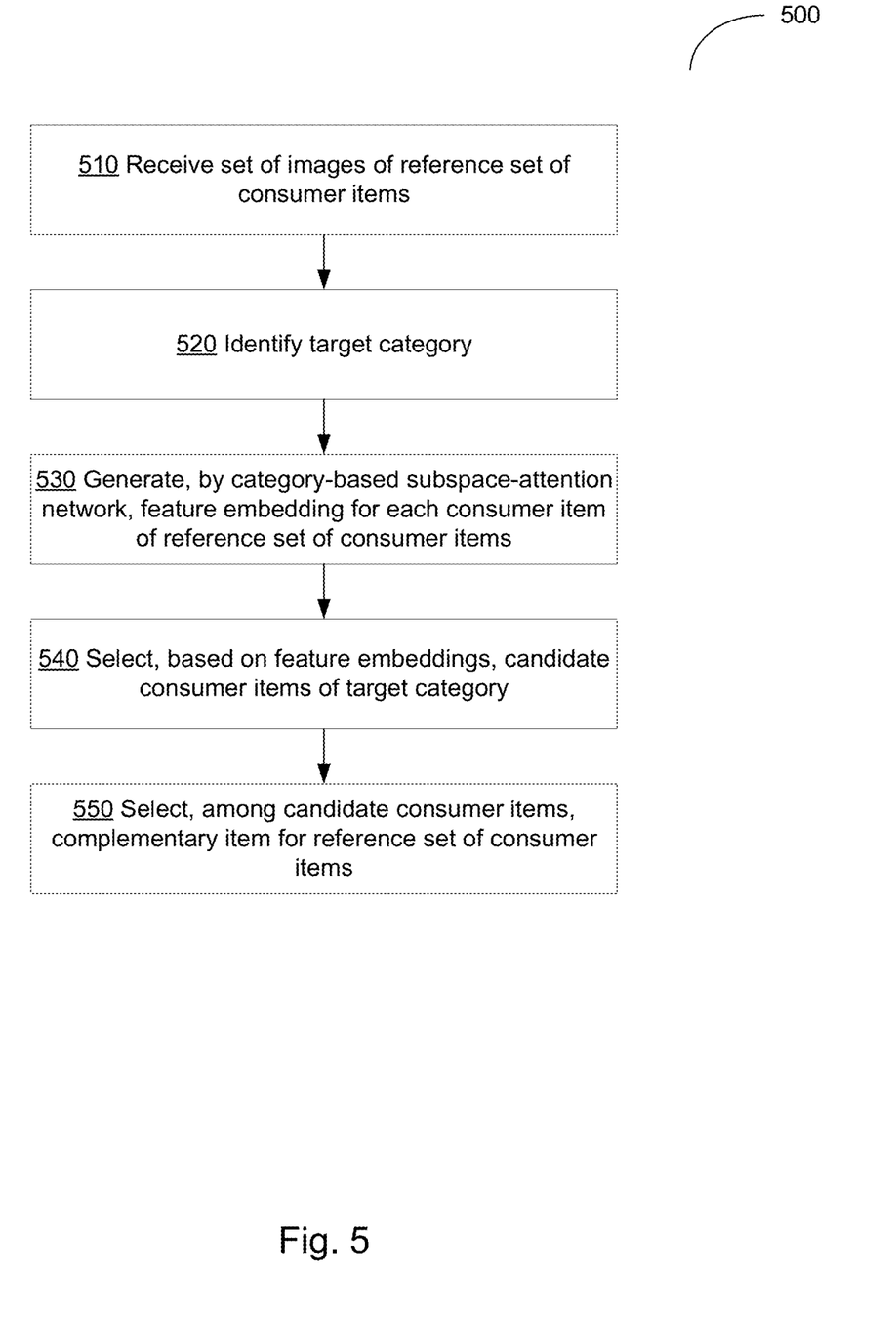
FIG. 5 is a flow diagram of an example method of complementary item selection for a given fashion ensemble and a specified target category, in accordance with embodiments of the present disclosure.

FIG. 5 is a flow diagram of an example method of complementary item selection for a given set of consumer items and a specified target category, in accordance with embodiments of the present disclosure. Method 500 may be performed by processing logic that includes hardware (e.g., circuitry, dedicated logic, programmable logic, microcode, etc.), software (e.g., instructions run on a processor to perform hardware simulation), or a combination thereof. Method 500 or each of its individual functions, routines, subroutines, or operations may be performed by one or more processors of a computer system (e.g., the computing device 800 of FIG. 8) implementing the method. In one embodiment, method 500 may be performed by a single processing thread.

Alternatively, method 500 may be performed by two or more processing threads, each thread implementing one or more individual functions, routines, subroutines, or operations of the method. In one embodiment, the processing threads implementing method 500 may be synchronized (e.g., using semaphores, critical sections, or other thread synchronization mechanisms). Alternatively, the processing threads implementing method 500 may be executed asynchronously with respect to each other. Therefore, while FIG. 5 and the associated description lists the operations of method 500 in certain order, various embodiments of the method may perform at least some of the described operations in parallel or in arbitrary selected orders.

Referring to FIG. 5, at block 510, the computer system implementing the method receives a set of one or more images of a reference set of consumer items, for which a complementary item needs to be identified. In various illustrative examples, the computer system may receive, e.g., via a user interface, a network interface, or an inter-process communication interface, an identifier of the reference set of consumer items. Responsive to receiving the identifier of the reference set of consumer items, the computer system may retrieve, from a consumer item image database, a set of images of consumer items comprised by the reference set of consumer items.

At block 520, the computer system identifies the category of the complementary item ("the target category"). In various illustrative examples, the computer system may receive the target category, e.g., via a user interface, a network interface, or an inter-process communication interface.

At block 530, the computer system sequentially feeds the set of images of consumer items of the reference set of consumer items to a category-based subspace-attention network implemented in accordance with embodiments of the present disclosure (e.g., category-based subspace-attention network 100 of FIG. 1). The network category-based subspace-attention network generates, for each consumer item of the reference set of consumer items, a corresponding feature embedding representing the consumer item in relation to the target category, as described in more detail herein above.

At block 540, the computer system utilizes the computed embeddings to select, from a set of available consumer items (e.g., stored in a database), one or more candidate items of the specified target category. In an illustrative example, the computer system selects, for each consumer item of the reference set of consumer items, a predetermined number of items that are closest, in view of a chosen distance metric, to the consumer item of the reference set of consumer items. In an illustrative example, the distance between two consumer items may be represented by a distance between their respective embeddings: d $(f_i^o, f_i^s)$, as described in more detail herein above.

At block 550, the computer system selects, among the plurality of candidate items, a complementary item to be associated with the reference set of consumer items. In an illustrative example, the computer system selects, among the identified candidate items, a consume item that is closest, in view of a chosen distance metric, to the reference set of consumer items. In an illustrative example, the distance between a given consumer item and a given set of consumer items may be computed using equation (5), as described in more detail herein above.

Figure 6:
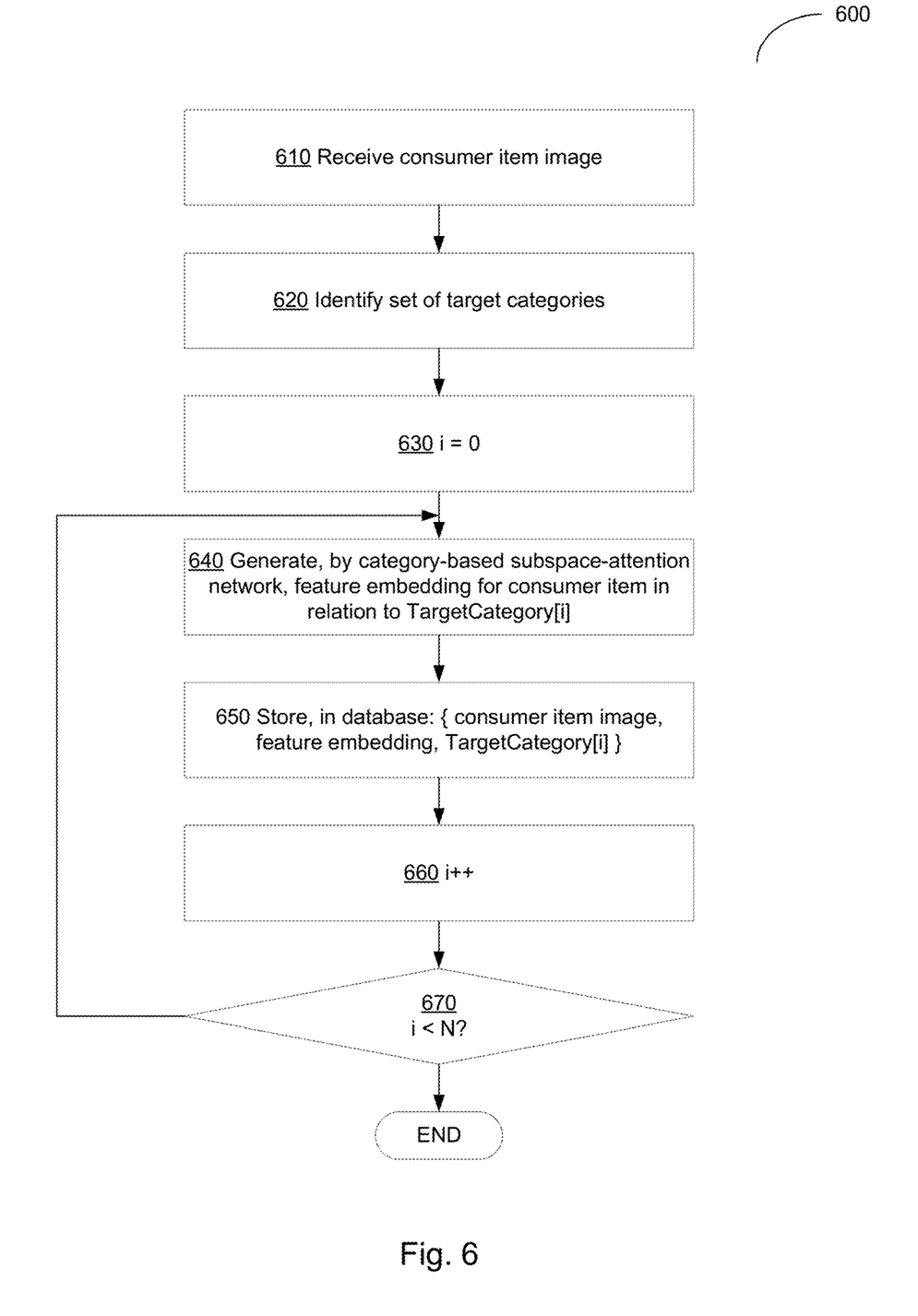
FIG. 6 is a flow diagram of an example method of indexing a database of consumer items using feature embeddings by a category-based subspace-attention network implemented in accordance with embodiments of the present disclosure.

FIG. 6 is a flow diagram of an example method of indexing a database of consumer items using feature embeddings by a category-based subspace-attention network implemented in accordance with embodiments of the present disclosure. Method 600 may be performed by processing logic that includes hardware (e.g., circuitry, dedicated logic, programmable logic, microcode, etc.), software (e.g., instructions run on a processor to perform hardware simulation), or a combination thereof. Method 600 or each of its individual functions, routines, subroutines, or operations may be performed by one or more processors of a computer system (e.g., the computing device 800 of FIG. 8) implementing the method. In one embodiment, method 600 may be performed by a single processing thread. Alternatively, method 600 may be performed by two or more processing threads, each thread implementing one or more individual functions, routines, subroutines, or operations of the method. In one embodiment, the processing threads implementing method 600 may be synchronized (e.g., using semaphores, critical sections, or other thread synchronization mechanisms). Alternatively, the processing threads implementing method 600 may be executed asynchronously with respect to each other. Therefore, while FIG. 6 and the associated description lists the operations of method 600 in certain order, various embodiments of the method may perform at least some of the described operations in parallel or in arbitrary selected orders.

Referring to FIG. 6, at block 610, the computer system implementing the method receives an image of a consumer item. In various illustrative examples, the computer system may receive the image, e.g., via a network interface, an optical imaging interface, or an inter-process communication interface.

At block 620, the computer system identifies a set of target consumer item categories. In various illustrative examples, the computer system may receive the set of target consumer item categories, e.g., via a user interface, a network interface, or an inter-process communication interface.

At block 630, the computer system initializes the counter of consumer item categories.

At block 640, the computer system generates, by a neural network, a feature embedding representing the consumer item in relation to the target category identified by the counter of consumer item categories. In an illustrative example, the neural network may be represented by a category-based subspace-attention network implemented in accordance with embodiments of the present disclosure (e.g., category-based subspace-attention network 100 of FIG. 1), as described in more detail herein above.

At block 650, the computer system stores, in a database, a record comprising the consumer item image, the feature embedding, and the target category identified by the counter of consumer item categories.

At block 660, the computer system increments the counter of consumer item categories.

Responsive to determining, at block 670, that the counter of consumer item categories is less than the number of consumer item categories, the method loops back to block 640; otherwise, the method terminates.

Figure 7:
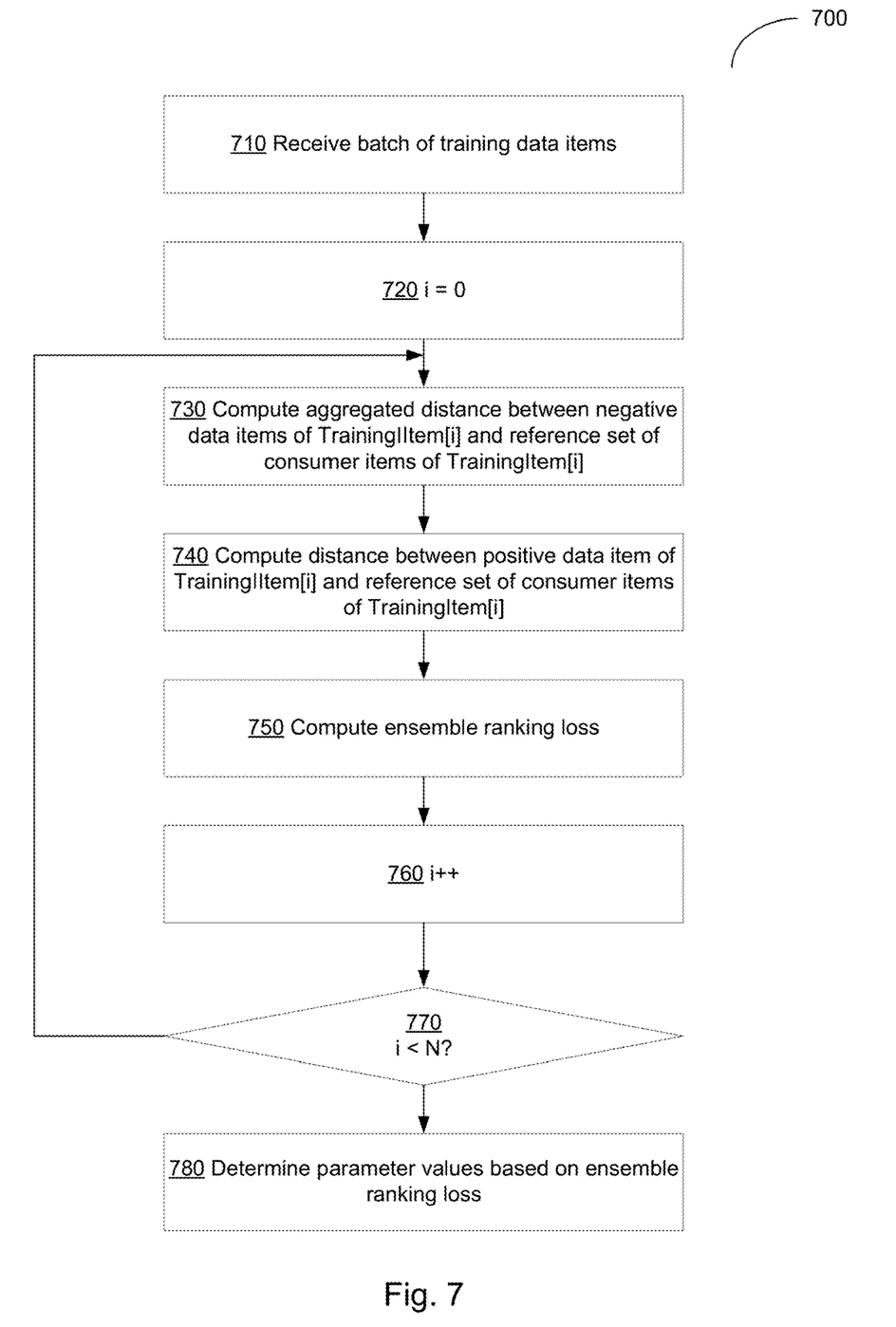
FIG. 7 is a flow diagram of an example method of training a category-based subspace-attention network implemented in accordance with embodiments of the present disclosure.

FIG. 7 is a flow diagram of an example method of training a category-based subspace-attention network implemented in accordance with embodiments of the present disclosure. Method 700 may be performed by processing logic that includes hardware (e.g., circuitry, dedicated logic, programmable logic, microcode, etc.), software (e.g., instructions run on a processor to perform hardware simulation), or a combination thereof. Method 700 or each of its individual functions, routines, subroutines, or operations may be performed by one or more processors of a computer system (e.g., the computing device 800 of FIG. 8) implementing the method. In one embodiment, method 700 may be performed by a single processing thread. Alternatively, method 700 may be performed by two or more processing threads, each thread implementing one or more individual functions, routines, subroutines, or operations of the method. In one embodiment, the processing threads implementing method 700 may be synchronized (e.g., using semaphores, critical sections, or other thread synchronization mechanisms). Alternatively, the processing threads implementing method 700 may be executed asynchronously with respect to each other. Therefore, while FIG. 7 and the associated description lists the operations of method 700 in certain order, various embodiments of the method may perform at least some of the described operations in parallel or in arbitrary selected orders.

Referring to FIG. 7, at block 710, the computer system implementing the method receives a training dataset comprising a batch of training data items, such that each training data item includes a reference set of images representing a reference set of consumer items, an image of a positive consumer item that is compatible with the reference set of consumer items, and a set of images of negative consumer items that are incompatible with the reference set of consumer items. In various illustrative examples, the computer system may receive the training dataset, e.g., via a user interface, a network interface, or an inter-process communication interface.

At block 720, the computer system initializes the counter of training data items in the training dataset.

At block 730, the computer system computes, using a neural network, a value of a metric reflecting an aggregated distance between the negative consumer items of the training data item referenced by the counter and the reference set of consumer items of the training data item referenced by the counter. In an illustrative example, the distance between a given consumer item and a given set of consumer items may be computed using equation (5). The aggregated distance may be represented, e.g., by an average distance or a minimum distance. In an illustrative example, the neural network may be represented by a category-based subspace-attention network implemented in accordance with embodiments of the present disclosure (e.g., category-based subspace-attention network 100 of FIG. 1), as described in more detail herein above.

At block 740, the computer system computes, using the neural network, a value of the metric reflecting a distance between the positive consumer item of the training data item referenced by the counter and the reference set of consumer items of the training data item referenced by the counter. In an illustrative example, the distance between a given consumer item and a given set of consumer items may be computed using equation (5), as described in more detail herein above.

At block 750, the computer system computes, based on the computed metric value, the ensemble ranking loss of the reference set of consumer items of the training data item referenced by the counter. In an illustrative example, the ensemble ranking loss may be computed using equation (6), as described in more detail herein above.

Responsive to determining, at block 760, that the counter of training data items is less than the number of training data items in the training dataset, the method loops back to block 730; otherwise, the method continues at block 770.

At block 780, the computer system determines or modifies, based on the ensemble ranking loss, values of one or more parameters of the neural network. The parameters may include the masks ($m_1, \ldots, m_k$) that are applied to the visual feature vector, the attention weights $w_j$, which define the degree of influence of each component of the visual feature vector x on the resulting feature embedding f, and/or other parameters of category-based subspace-attention network. The observed error (e.g., represented by the error ranking loss) may be propagated back to the previous layers of the neural network, in which the edge weights and/or other network parameters are adjusted accordingly. This process may be repeated until the observed error falls below a predetermined threshold.

Figure 8:
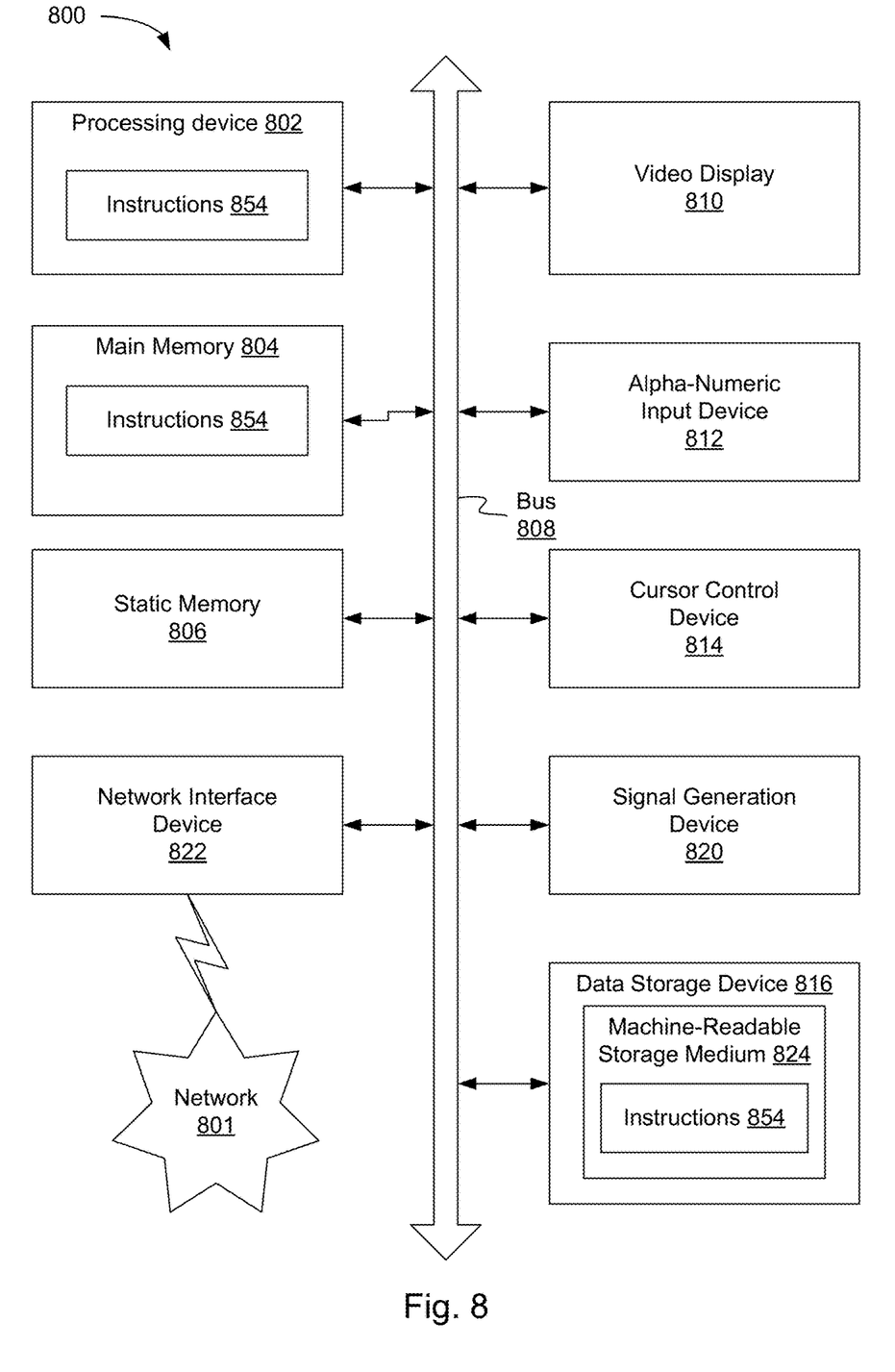
FIG. 8 illustrates a diagrammatic representation of a machine in the exemplary form of a computer system within which a set of instructions, for causing the machine to perform any one or more of the methods discussed herein, may be executed.

FIG. 8 illustrates a diagrammatic representation of a machine in the exemplary form of a computer system within which a set of instructions, for causing the machine to perform any one or more of the methods discussed herein, may be executed in one embodiment. A set of instructions for causing the computing device 800 to perform any one or more of the methods discussed herein may be executed by the computing device 800.

In one embodiment, the computing device 800 may be connected to other computing devices by a network 801 provided by a Local Area Network (LAN), an intranet, an extranet, the Internet or any combination thereof. The computing device may operate in the capacity of a server or a client machine in a client-server network environment or as a peer machine in a peer-to-peer (or distributed) network environment. The computing device may be a personal computer (PC), a tablet PC, a set-top box (STB), a Personal Digital Assistant (PDA), a cellular telephone, a web appliance, a server, a network router, switch, bridge or any machine capable of executing a set of instructions (sequential or otherwise) that specify actions to be taken by that machine. Further, while a single machine is illustrated, the term "computing device" shall also be taken to include any collection of machines (e.g., computers) that individually or jointly execute a set (or multiple sets) of instructions to perform any one or more of the methodologies discussed herein.

In one embodiment, the computing device 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.) and a data storage device 816, which communicate with each other via a bus 808. The main memory 804 may be further employed for storing various data structures utilized by the systems and methods described herein.

In one embodiment, the processing device 802 represents one or more general-purpose processors such as a microprocessor, central processing unit or the like. Processing device may include any combination of one or more integrated circuits and/or packages that may, in turn, include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 802 may therefore include multiple processors. The processing device 802 may include a complex instruction set computing (CISC) microprocessor, reduced instruction set computing (RISC) microprocessor, very long instruction word (VLIW) microprocessor, processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor or the like.

In one embodiment, the computing device 800 may further include one or more network interface devices 822. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and a signal generation device 820 (e.g., a speaker).

In one embodiment, the data storage device 818 may include a computer-readable storage medium 824 on which is stored one or more sets of instructions 854 embodying any one or more of the methods or functions described herein, including method 600 of complementary item selection for a given set of consumer items and a specified target category, method 700 of indexing a database of consumer items using feature embeddings by a category-based subspace-attention network, and/or method 700 of training a category-based subspace-attention network implemented in accordance with embodiments of the present disclosure.

The instructions 854 may also reside, completely or at least partially, within the main memory 804 and/or within the processing device 802 during execution thereof by the computing device 800; the main memory 804 and the processing device 802 also constituting machine-readable storage media.

While the computer-readable storage medium 824 is shown as a single medium, the term "computer-readable storage medium" should be taken to include a single medium or multiple media (e.g., a centralized or distributed database and associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methods described herein. Examples of computer-readable storage media include, but not limited to, solid-state memories, optical media and magnetic media.

The preceding description sets forth numerous specific details such as examples of specific systems, components, methods and so forth, in order to provide a good understanding of various embodiments described herein. It will be apparent to one skilled in the art, however, that at least some embodiments may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

In the above description, numerous details are set forth. It will be apparent, however, to one of ordinary skill in the art having the benefit of this disclosure, that certain embodiments described herein may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. These signals may include bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, passages utilizing terms such as "determining", "identifying", "adding", "selecting" or the like, describe the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations described herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

The above description is intended to be illustrative and not restrictive. Many other embodiments will be apparent to those of skill in the art upon reading and understanding the above description. The scope of the present disclosure should, therefore, be determined with reference to the appended claims, along with the full scope of equivalents to which such claims are entitled.

What is claimed is:

1. A method, comprising:
 receiving, by a computer system, an image representing a first consumer item of a reference set of consumer items;
 identifying a target category of a complementary consumer item to be associated with the reference set of consumer items;
 extracting, by a neural network processing a set of images representing the reference set of consumer items, a visual feature vector representing the first consumer item;
 applying a set of attention weight coefficients to the visual feature vector to produce a feature embedding representing the first consumer item in relation to the target category;
 selecting, using the feature embedding, from a set of available consumer items, a plurality of candidate consumer items associated with the target category; and
 selecting, among the plurality of candidate consumer items, the complementary consumer item to be associated with the reference set of consumer items.

2. The method of claim 1, wherein the reference set of consumer items consists of the first consumer item.

3. The method of claim 1, wherein the reference set of consumer items is one of: a fashion ensemble or a furniture set.

4. The method of claim 1, further comprising:
 training the neural network using a training dataset comprising a plurality of training data items, wherein a first training data item of the plurality of training data items comprises a training set of images representing a training set of consumer items, an image of a positive consumer item that is compatible with the training set of consumer items, and a set of images of negative consumer items that are incompatible with the training set of consumer items.

5. A computer system, comprising:
 a memory; and
 a processing device operatively coupled to the memory, the processing device to:
  receive an image of a consumer item;
  identify a set of target consumer item categories;
  generate, by a neural network, a first feature embedding representing the consumer item in relation to a first target category of the set of target consumer item categories, wherein the first target category is provided by a numeric vector reflecting functional designation of consumer items associated with the first target category;
  generate, by the neural network, a second feature embedding representing the consumer item in relation to a second target category of the set of target consumer item categories;
  store, in a database, a first record comprising an identifier of the consumer item, the first feature embedding, and the first target category; and
  store, in the database, a second record comprising an identifier of the consumer item, the second feature embedding, and the second target category.

6. The computer system of claim 5, wherein the processing device is further to:
 utilize the database for identifying a complementary consumer item that is compatible with a reference set of consumer items comprising one or more consumer items.

7. The computer system of claim 5, wherein generating the first feature embedding further comprises:
 extracting, by a first sub-network of the neural network, a visual feature vector representing the consumer item;
 computing, by a second sub-network of the neural network, a set of attention weight coefficients;
 applying the set of attention weight coefficients to the visual feature vector.

8. The computer system of claim 7, wherein the first sub-network is provided by a convolutional neural network.

9. The computer system of claim 7, wherein the second sub-network comprises a first fully-connected layer, a second fully-connected layer, and a function transforming an output of the first fully-connected layer into an input of the second fully-connected layer.

10. The computer system of claim 7, wherein the processing device is further to:
 train the neural network using a training dataset comprising a plurality of training data items, wherein a first training data item of the plurality of training data items comprises a set of images representing a training set of consumer items, an image of a positive consumer item that is compatible with the training set of consumer items, and a set of images of negative consumer items that are incompatible with the training set of consumer items.

11. A non-transitory computer-readable storage medium comprising executable instructions that, when executed by a processing device, cause the processing device to:
- receive an image representing a first consumer item of a reference set of consumer items;
- identify a target category of a complementary consumer item to be associated with the reference set of consumer items;
- extract, by a neural network processing a set of images representing the reference set of consumer items, a visual feature vector representing the first consumer item;
- apply a set of attention weight coefficients to the visual feature vector to produce a feature embedding representing the first consumer item in relation to the target category;
- select, using the feature embedding, from a set of available consumer items, a plurality of candidate consumer items associated with the target category; and
- select, among the plurality of candidate consumer items, the complementary consumer item to be associated with the reference set of consumer items.

12. The non-transitory computer-readable storage medium of claim 11, wherein the reference set of consumer items is one of: a fashion ensemble or a furniture set.

13. The non-transitory computer-readable storage medium of claim 11, further comprising executable instructions that, when executed by the processing device, cause the processing device to:
- training the neural network using a training dataset comprising a plurality of training data items, wherein a first training data item of the plurality of training data items comprises a training set of images representing a training set of consumer items, an image of a positive consumer item that is compatible with the training set of consumer items, and a set of images of negative consumer items that are incompatible with the training set of consumer items.

* * * * *